United States Patent
Chiu

(10) Patent No.: US 7,801,322 B2
(45) Date of Patent: Sep. 21, 2010

(54) EARPHONE SPIRO-DEVICE

(75) Inventor: Lien-Cheng Chiu, Taipei (TW)

(73) Assignee: Inventec Appliances Corp., Taipei (TW)

( * ) Notice: Subject to any disclaimer, the term of this patent is extended or adjusted under 35 U.S.C. 154(b) by 1132 days.

(21) Appl. No.: 11/453,807

(22) Filed: Jun. 16, 2006

(65) Prior Publication Data

US 2007/0041579 A1    Feb. 22, 2007

(30) Foreign Application Priority Data

Jun. 17, 2005    (TW) .............................. 94120266 A

(51) Int. Cl.
    *H04R 25/00*    (2006.01)
(52) U.S. Cl. ...................................... 381/384; 381/370
(58) Field of Classification Search ................. 381/370, 381/384; 379/430
    See application file for complete search history.

(56) References Cited

U.S. PATENT DOCUMENTS

| 6,731,956 B2 * | 5/2004 | Hanna et al. ............. 455/575.2 |
| 2003/0165237 A1 * | 9/2003 | Farr et al. .................... 379/430 |
| 2004/0077387 A1 * | 4/2004 | Sayag et al. ................ 381/370 |

* cited by examiner

*Primary Examiner*—Brian Ensey
(74) *Attorney, Agent, or Firm*—Birch, Stewart, Kolasch & Birch, LLP

(57) ABSTRACT

An earphone spiro-device is used in an electrical device for rolling up the wire of the earphone. The earphone spiro-device includes a rolling axle, a rotating element and a controlling element. The surface of the rolling axle has a spiral trough for containing the wire of the earphone. The rotating element can drive the rolling axle in the specified direction and then roll the wire of the earphone along the spiral trough. Also, the controlling element can control the rotation of the rolling axle.

10 Claims, 3 Drawing Sheets

EARPHONE SPIRO-DEVICE

FIELD OF THE INVENTION

The present invention generally relates to an earphone spiro-device, and more particularly to the earphone that can roll up a wire of the earphone into an electrical device.

DESCRIPTION OF THE RELATED ART

Lately, the earphone becomes a daily accessory for the consumer electrical products having audio functions, as a cell phone, a PDA, an mp3 and a WALKMAN. In general, the earphone, from the traditional single earphone to the stereo hanging up earphone, needs to dispose a wire for news dispatched electrically with the electrical device.

Please refer to FIG. 1 for a perspective view of the conventional earphone spiro-device 1. The device 1 comprises at least a speaker 11, a wire 12 and a connector plug 13 connected to the speaker 11 via the wire 12. However, due to the wire 12 is less protection from free bending, possible internal problem in broken cord may cause a transmission problem and lead to a short service life of the earphone. So in storage, the user usually winds the wire and then fixes the circled wire by a rubber band. However, it is inconvenient for the user. Or, the wire can be wound around onto a rolling wire seat for convenient collection. Yet, because the rolling wire seat is inconvenient in the carrying and storing, such an accessory is still not satisfied.

In general, while the user forgets to carry the earphone, they cannot use the audio function of the electrical device. Therefore, the user usually winds the wire of the earphone outside around the electrical device. However, such an action would not only be inartistic, but also causes the life of the earphone to be reduced by the possible broken problem in inner electric cording.

SUMMARY OF THE INVENTION

The object of the present invention is to provide an earphone spiro-device to roll up a wire of the earphone in an electrical device for saving the conventional drawback of the wire of the earphone in the carrying and collecting.

The earphone spiro-device of the present invention includes a rolling axle, a rotating element and a controlling element. The surface of the rolling axle has a spiral trough to contain the wire of the earphone. The rotating element drives the rolling axle in a specified direction, and thus rolls the wire of the earphone along the spiral trough. The controlling element can control the rotation of the rolling axle.

In one aspect of the present invention, the rotating element is a motor and the controlling element is a switch for controlling the motor. The rotating element can be a torsion spring. The controlling element can be a button for releasing the rotating torsion of the torsion spring by pressing the button.

The electrical device comprises an outward-wire aperture for the wire of the earphone to be set free. The earphone spiro-device further comprises a holding element for fixing the length of the wire exterior to the outward-wire aperture.

In the present invention, the rolling axle can be a metal axle or a plastics axle.

In the present invention, the electrical device can be a Walkman, a cell phone or a PDA.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTIONS OF THE PREFERRED EMBODIMENTS

The present invention discloses to an earphone spiro-device, and more particularly to the one that can roll up a wire of the earphone in an electrical device.

Figure 1:
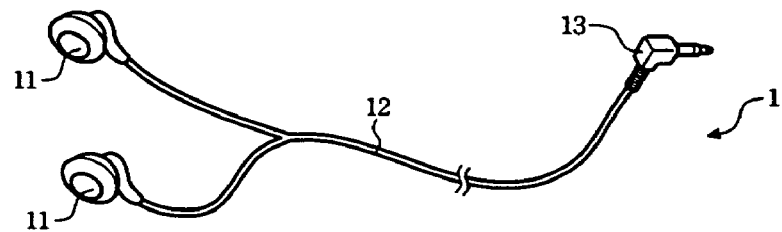
FIG. 1 shows a perspective view of a conventional earphone.
Figure 2:
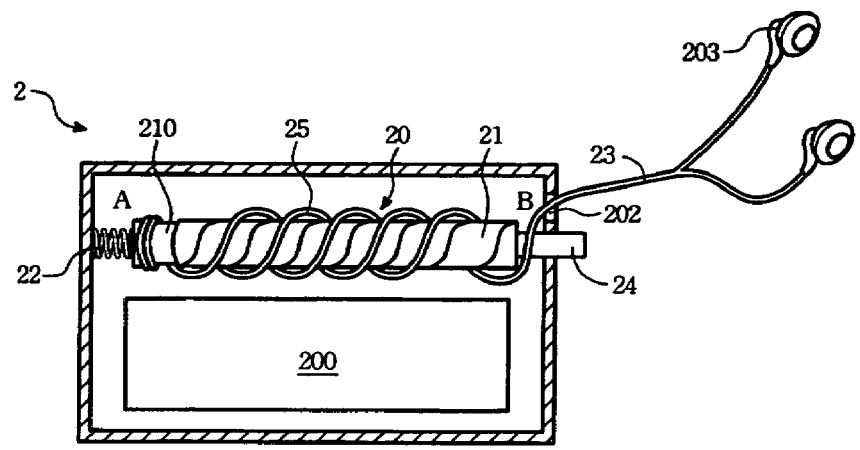
FIG. 2 shows a schematic view of a preferred earphone spiro-device in according to the present invention.

Please refer to FIG. 2 for a schematic view of the conventional earphone spiro-device. The electrical device 2 has an internal disposed room, which includes a circuit board 200 and an earphone spiro-device 20. The earphone spiro-device 20 is for rolling up the wire of the earphone 23 into the electrical device. The earphone spiro-device 20 comprises a rolling axle 21, a rotating element 22 and a controlling element 24. The rolling axle 21 has a spiral trough 25 on the surface to contain the wire of the earphone 23. The rotating element 22 is used to drive the rolling axle 21 in a specified direction for rolling the wire of the earphone 23 along the spiral trough 25. The controlling element 24 is used to control and rotate the rolling axle 21.

The rotating element 22 connects one side of the earphone spiro-device 20 at one end A of the rolling axle 21 and the controlling element 24, while another end B of the rolling axle 21 extends through out another side of the earphone spiro-device 20 as shown. One end of the wire of the earphone 23 connects to the end A of the rolling axle 21 at a groove 210, and then the wire 23 winds along the spiral trough 25 of the surface of the rolling axle 21 to the end B of the rolling axle 21. By providing an outward-wire aperture 202 to the electrical device 2, the wire 23 can extend outside through the outward-wire aperture 202 and connect to an earphone 203.

Figure 3:
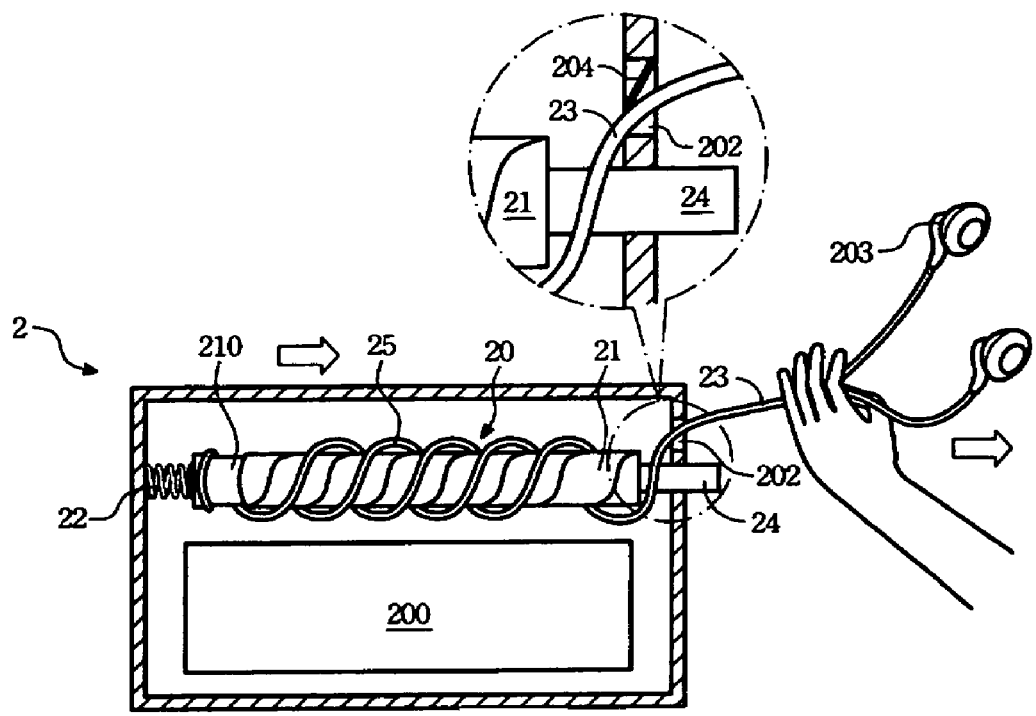
FIG. 3 shows how the wire of FIG. 2 is pulled out from the earphone spiro-device.

Referring to FIG. 3, how the wire is pulled in the earphone spiro-device is shown.

While the user pulls out the wire 23 by a pulling force, the wire 23 can be dragged out from the outward-wire aperture 202. It is shown that the wire 23 is originally contained in the spiral trough 25 and is unwound to extend through the outward-wire aperture 202 upon meeting the pulling force. At the pulling time, the rolling axle 21 rotates in a clockwise direction as shown, and meanwhile the rotating element 22 as a torsion spring is rotated according to the stored potential energy which will be released at a later time to rotate automatically the rolling element 21 in a counter clockwise direction. In the present invention, the rolling axle 21 can be a metal axle or a plastics axle.

The earphone spiro-device 20 further comprises a holding element 204 to be seated on the outward-wire aperture 202 elastically wedged with the earphone spiro-device 20. As soon as the pulling force of the user is stopped at a state that the wire 23 is pulled out by a predetermined length, the holding element 204 fixed in the outward-wire aperture 202 would automatically come into action to cease the movement of the wire 23 at the needed length. That is to say the rolling axle 21 can stop rotating while the user force is removed. In the present invention, the holding element 204 can be a plastics slice.

Figure 4:
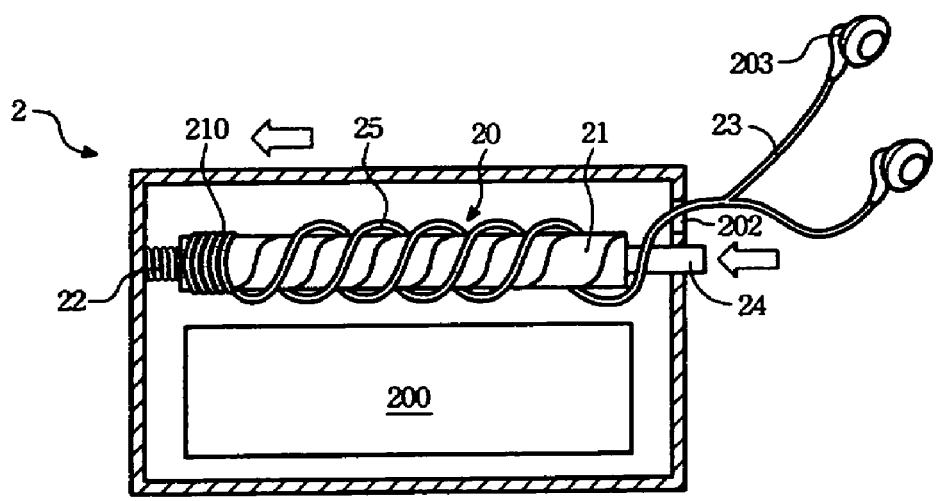
FIG. 4 shows how the wire of FIG. 2 can be collected into the earphone spiro-device.

Referring to FIG. 4, a schematic view is used to show how the wire 23 is collected into the earphone spiro-device in the present invention.

When the user presses the controlling element 24, the holding element 204 shifts to release the wire 23, the potential energy stored in the rotating element 22 is released to rotate automatically the rolling axle 21 in the counter clockwise direction, and then the wire 23 is retrieved along the spiral trough 25 to rewind around the rolling axle 21 again at the groove 210. At a final state of the wire retrieving, the earphone 203 blocks outside the outward-wire aperture 202 for the outward-wire aperture 202 is smaller in size than the earphone 203. Also at the final state, the wire of the earphone 23 is collected into the groove 210 and also in the spiral trough 25.

In another embodiment of the earphone spiro-device in accordance with the present invention not shown herein, the rotating element 22 is a motor electrically connected to the circuit board 200, the controlling element 24 also electrically connected to the circuit board 200 is a switch for controlling the motor. Hence, upon adjusting the switch 24, the motor can drive the rolling axle 21 in both the clockwise and counter clockwise directions, and the wire 23 can be rolled along the spiral trough 25.

Figure 5:
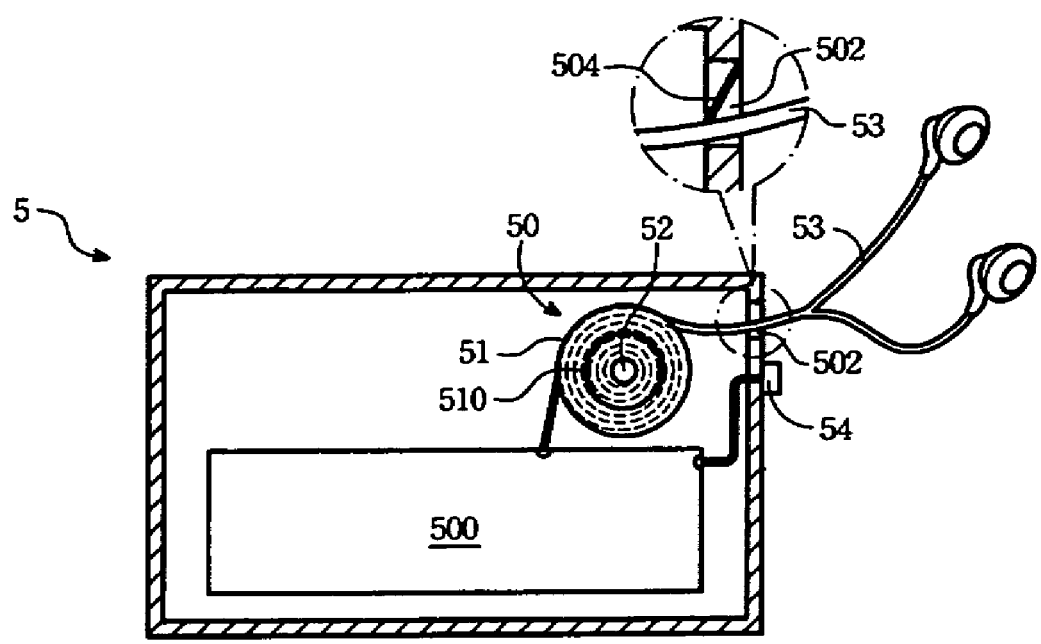
FIG. 5 is another embodiment of the earphone spiro-device according to the present invention.

Please refer to FIG. 5, where another embodiment of the earphone spiro-device according to the present invention is shown. The earphone spiro-device 50 of electrical device 5 comprises a revolving dish 51, a rolling axle 52, a controlling element 54 and a wire 53.

The electrical device 5 has an interior disposed room which contains a circuit board 500 and the earphone spiro-device 50. The edge of the revolving dish 51 has a fillister 510 to roll up the wire 53, and the center of the revolving dish 51 has an axle hole to mount the rolling axle 52. The rolling axle 52 further connects to a rotating element (not shows in the figure), which connects to the circuit board 500. The controlling element 54 is a switch and connects also to the circuit board 500. The rotating element is a motor to drive the rolling axle 52.

Therefore, while the user switches on the switch of the controlling element 54, the circuit board 500 drives the motor to rotate the rolling axle 52 in a fixed direction, the rolling axle 52 drives the revolving dish 51 in the fixed direction, and then the wire 23 is rolled up in the fillister 510. When the wire 23 reaches a needed length, the user can switch off the switch. The electrical device 5 includes an outward-wire aperture 502 for the wire of the earphone to extend out of the device. The earphone spiro-device 50 further comprises the holding element 504 seated on the outward-wire aperture 502 for helping stop the movement of the wire 53. After the user pulls the wire 53 out to a needed length, the holding element 504 can be held in the outward-wire aperture 502 by structural interference between the wire 54 and the holding element 504. At this time, the rotation of the revolving dish 51 is stopped. In the present invention, the holding element 504 is a plastics slice.

Therefore, the earphone spiro-device in the present invention has merits as follows:

1. For the earphone spiro-device in the present invention rolls the wire by a helix way provided by the rolling axle, the wire can be orderly collected in the spiral trough, and so the problem of the wire loosing can be avoided.

2. Conventionally, when the user collects the wire, the wire can be fixed by the rubber band. On the other hand, the earphone spiro-device in the present invention can automatically collect the wire.

3. The extra fixed seat for collecting the wire in the conventional design is no more needed in the earphone spiro-device of the present invention. So the problem of forgetting carrying the fixed seat would be never met.

4. The earphone spiro-device is constructed in the electrical device, so the appearance of the device won't be substantially affected.

I claim:

1. An earphone spiro-device for rolling up a wire of the earphone in an electrical device, comprising:
    a rolling axle having a spiral trough on a surface thereof to contain the wire of the earphone;
    a rotating element for driving the rolling axle in a specified rotating direction so as to roll the wire of the earphone into the spiral trough; and
    a controlling element for controlling rotation of the rolling axle.

2. The earphone spiro-device according to claim 1, wherein said rotating element is a motor and the controlling element is a switch for controlling the motor.

3. The earphone spiro-device according to claim 1, wherein said rotating element is a torsion spring and the controlling element is a button for releasing the torsion spring.

4. The earphone spiro-device according to claim 1, wherein said electrical device comprises an outward-wire aperture for passing therethrough the wire of the earphone.

5. The earphone spiro-device according to claim 4, further comprising a holding element seated on the outward-wire aperture for fixing length of the wire.

6. The earphone spiro-device according to claim 1, wherein said rolling axle is a metal axle.

7. The earphone spiro-device according to claim 1, wherein said rolling axle is a plastic axle.

8. The earphone spiro-device according to claim 1, wherein said electrical device is a WALKMAN.

9. The earphone spiro-device according to claim 1, wherein said electrical device is a cell phone.

10. The earphone spiro-device according to claim 1, wherein said electrical device is a PDA.

* * * * *